United States Patent Office 3,322,687
Patented May 30, 1967

3,322,687
CATALYST AND METHOD FOR PREPARING ACRYLONITRILE
Jamal S. Eden, Akron, Ohio, and Charles E. Ziegler, Therwil, Basel-Land, Switzerland, assignors to The B. F. Goodrich Company, New York, N.Y., a corporation of New York
No Drawing. Filed Jan. 27, 1964, Ser. No. 340,533
4 Claims. (Cl. 252—437)

This invention relates to a method of preparing acrylonitrile from propylene, an oxygen containing gas and ammonia at elevated temperatures in the presence of an oxidation catalyst containing tellurium and rhenium and to the catalyst itself. More particularly, the invention relates to a method of preparing acrylonitrile in one step by passing a mixture of propylene, an oxygen containing gas, ammonia and, desirably, water vapor over a ctalyst comprising a molybdate or phosphomolybdate containing a tellurium and a rhenium compound at a temperature of from about 350° to about 500° C.

The vapor phase preparation of acrylonitrile from propylene, oxygen, ammonia and water vapor in the presence of bismuth and antimony molybdates or phosphomolybdates and bismuth phosphotungstate at temperatures of from 500° F. to 1000° F. is described in U.S. Patent 2,904,580.

It has been found that if certain tellurium and rhenium compounds are added to certain molybdate or phosphomolybdate, particularly those of bismuth and tin, the yields of acrylonitrile are increased greatly, and, if the catalyst is prepared in a proper way, the production of by-products, acetonitrile and HCN, is suppressed almost completely. The acetonitrile and HCN are undesirable, because they must be removed from the acrylonitrile and the purification step can be very difficult, particularly if some acrolein is also formed as a by-product, in which case an acrolein cyanohydrin is formed with HCN. In addition, the amounts of HCN and acetonitrile usually formed in the reaction are such that economical recovery is not possible, yet the amounts are sufficient to cause serious disposal problems of refuse from the purification step. Because of their solubility in water and their toxicity they must either be converted to non-toxic products as by hydrolysis or they must be removed from the water prior to disposal through usual sewage systems.

The overall desired reaction of this invention can be written empirically as follows:

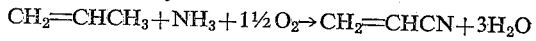

$$CH_2=CHCH_3 + NH_3 + 1\tfrac{1}{2} O_2 \rightarrow CH_2=CHCN + 3H_2O$$

There are, however, several competing reactions which can consume some oxygen or ammonia or both. Invariably some oxides of carbon and nitrogen are also formed during the reaction. Nevertheless, it is possible to obtain acrylonitrile in fair yields at ratios of propylene to $NH_3$ as low as 1 to 0.5, but, preferably, the ratio should be at least 1 to 1 and more desirably about 1 to 2 to obtain maximum yields.

The oxygen to propylene ratio is not particularly critical, but in order to get good conversion and yields it is desirable to have at least stoichiometric quantities of oxygen (1½ mols of $O_2$ per mol of propylene) and preferably the oxygen should be present in an excess 33 to 100 mol percent, i.e., 2–3 mols per mol of propylene.

The water vapor does not seem to take part, per se, in the overall reaction, but its presence does have a salutary effect on conversion and yield of acrylonitrile. The amount of water can vary considerably, from about 0.5 to about 5 mols per mol of propylene, but very satisfactory results are obtained with about 2 to 4 mols $H_2O$ per mol of propylene.

If desired, diluent gases can be employed. Included among such gases are the low molecular weight alkanes. Thus, it is possible to feed propylene contaminated with propane, ethane or the butanes without altering the course of the desired reaction, because the saturated hydrocarbons, if they react at all, are converted in small yields to carbon oxides and water.

The catalysts can be prepared by several procedures which are given below.

PROCEDURE 1

In this procedure the catalyst was prepared from a slurry of molybdic acid by adding a bismuth salt, tellurium oxide and perrhenic acid thereto. It was supported on a silica base and contained the following:

| Ingredient: | Amount |
|---|---|
| $Bi(NO_3)_3 \cdot 5H_2O$ | g__ 58.2 |
| $MoO_3$ (85%) | g__ 27.2 |
| $TeO_2$ | g__ 5.74 |
| $HReO_4$ | g__ .30 |
| $H_3PO_4$ (85%) | g__ .93 |
| Silica (Ludox HS)* | g__ 75.0 |
| $H_2O$ | ml__ 80 |
| $HNO_3$ (conc.) | ml__ 4 |

*Ludox HS is an aqueous dispersion of silica containing about 30% $SiO_2$ and the remainder is essentially all water. It has an $SiO_2/Na_2O$ ratio of about 95, a pH of 9.8 and an average particle size of about 15 microns.

The nitric acid was first added to the water and then the $MoO_3$ was added to the acid solution. The bismuth nitrate was then added to the $MoO_3$ slurry and finally the $H_3PO_4$, $HReO_4$ and $TeO_2$ were added. The mixture at this stage was a slurry, believed to contain bismuth phosphomolybdate perrhenic acid and tellurium oxide. This mixture was then added to the Ludox dispersion and dried in air at about 100° C. After drying, the catalyst was baked in an air oven for about 16 hours at approximately 400° C. It was then ground and screened to pass through sieves of 10–18 mesh (U.S.).

PROCEDURE 2

| Ingredient: | Amount |
|---|---|
| Silica dispersion (Ludox HS) | g__ 150 |
| $HReO_4$ | g__ 0.6 |
| $H_3PO_4$ (85%) | g__ 1.86 |
| $TeO_2$ (tech.) | g__ 1.50 |
| Ammonium molybdate | g__ 68.00 |
| $Bi(NO_3)_3 \cdot 5H_2O$ | g__ 116.40 |
| HCl (conc.) | ml__ 58 |
| $HNO_3$ (conc.) | ml__ 150 |
| Water | ml__ 1512 |

The nitric acid was added to 150 ml. water. The perrhenic acid was dissolved in 2 ml. water and $TeO_2$ was dissolved in 58 ml. hot HCl and filtered. The ammonium molybdate was dissolved in 680 ml. water, with the aid of heat and stirring and the addition of 20 ml. of the aqueous nitric acid solution. The bismuth nitrate was dissolved in 130 ml. of the aqueous nitric acid solution with stirring and heating.

The silica dispersion was placed in an evaporating dish on a steam bath. Then the $TeO_2$, $HReO_4$ and $H_3PO_4$ were added and stirred thoroughly. The ammonium molybdate solution was added to the above mixture and finally the bismuth nitrate solution was added. Up to the point of the addition of the bismuth nitrate all the ingredients except the silica remained in solution. On addition of the bismuth nitrate the formation of a bismuth phosphomolybdate slurry resulted. The final mixture was stirred well and dried in an air oven at 100° C. and then baked for 16 hours at about 400° C. The catalyst was then ground and passed through a 10–18 mesh sieve (U.S.).

PROCEDURE 3

| Ingredient: | Amount |
|---|---|
| $Bi(NO_3)_3 \cdot 5H_2O$ | g_ 116.4 |
| Ammonium molybdate | g_ 68.0 |
| $TeO_2$ (tech.) | g_ 11.5 |
| $HReO_4$ | g_ 0.6 |
| $H_3PO_4$ (85% aqueous) | g_ 1.86 |
| Silica (Davidson S.G.) | g_ 542.0 |
| HCl (conc.) | ml_ 58 |
| $HNO_3$ (50% by vol. in water) | ml_ 150 |
| Water | ml_ 930 |

The bismuth nitrate was dissolved in the nitric acid. The ammonium molybdate was added to 680 ml. of water and 20 ml. of the $HNO_3$ solution were added to dissolve the ammonium molybdate. The perrhenic acid was dissolved in 2 ml. water and added to the ammonium molybdate solution. The latter solution was stirred while the silica was added. Then 250 ml. water were added to the silica-molybdate-perrhenic acid mixture to form a fluid paste. The $TeO_2$ was dissolved in the HCl and filtered and then added to the silica containing slurry. The bismuth nitrate solution was added to the silica slurry and finally the $H_3PO_4$ was mixed into the catalyst. On addition of the $H_3PO_4$ a precipitate forms which coats uniformly the silica particles. The final color of the catalyst was a deep yellow. The catalyst was dried on a steam bath and then baked in an oven at 400° C.

Other phosphomolydbate catalysts containing tin or antimony can be prepared by following the above procedures.

For the purpose of this application the catalysts prepared by procedures 2 and 3 above are termed "homogeneous" catalysts because all the ingredients except silica are in solution until the addition of the final ingredient which effects precipitation on the support.

The catalysts can be used either with or without supports, although a support is preferred. In addition, the catalyst can be employed in either a fixed or fluidized bed. The fluidized bed process provides means for better temperature control and minimizes development of hot spots and for this reason is more desirable than the fixed bed operation.

In addition to silica, other finely divided supports can be used. These include alumina, silicon carbide, clays, diatomaceous earth, etc. Of these supports, silica is most desirable because of its comparatively low cost, uniformity of composition and particle size and readily availability.

The contact time can vary between about 1 to about 40 seconds, but for best results contact times of 15 to about 30 seconds are most satisfactory.

Surprisingly, excellent conversions of propylene and yields of acrylonitrile are obtained at temperatures as low as about 350° C. but the preferred temperature range is 400–425° C.

The examples which follow are intended to illustrate the invention and not as limitations thereon.

Example I

A catalyst prepared by procedure 2 above was used in this run. The molar ratio of ingredients in the catalyst were bismuth photosphomolybdate 100, $TeO_2$ 30, $HReO_4$ 1, silica 250.

Sixty ml. of catalyst of 10–18 U.S. screen mesh were placed in a reactor made of high silica glass (Vycor) tube having an internal diameter of ¾ inch. The catalyst filled a depth of about 6 inches in the tube.

The reactor had three inlets, one for a mixture of propylene and oxygen, one for water vapor, and one for ammonia, which can be either in gaseous or vapor form as concentrated $NH_4OH$. The reactor was equipped with a movable thermocouple, so that the temperature at any part of the unit in which the reaction was occurring could be measured. The outlet from the reactor was connected to a drying tube to remove water. Gases which passed through the drying tube were passed through a vapor phase chromatograph (Perkin-Elmer Vapor Refractometer, Model 154) for continuous analysis of gaseous effluent from the reactor. The reactor was provided with electrical heating elements to preheat the ingredients entering the reaction zone and to maintain the desired temperature. Variable amounts of catalysts can be used and the catalyst can be in a fixed or fluidized bed. For fluid bed systems the amount of catalyst used will vary somewhat depending on the velocity of gases being fed into the reactor, the contact time and the length of the reactor. The quantity of catalyst, however, should form a bed at least about 6 inches high and the maximum height is not critical, but it should be adjusted to avoid excessive loss of catalyst from the reactor by the stream velocity.

A mixture of air and propylene in a ratio of 68.3 volumes of air to 7.1 of propylene was prepared and fed into the reactor at a rate of 5.9 liters per hour. Water at the rate of .06 mol and ammonia at the rate of .025 mol per hour were also fed simultaneously with the propylene-oxygen mixture. The entire mass of feed stock was heated to 200–250° C. before contacting the catalyst, which was preheated to 450° C. and held at 400–450° C. during the run. The contact time was about 30 seconds. The temperature recorded at various portions of the reactor varied from 400° C. at the first inch of the bed to 445° C. at 3½ inches from the inlet and 420° C. at the top of the bed.

The dry gaseous reaction effluent contained the following mol percent of ingredients. $N_2$–81.0; $O_2$–2.5; acrylonitrile 8.5; acetonitrile 1.24; CO–0.2; $CO_2$–3.1; HCN–1.28; and propylene 2.06. From these values it was calculated that the conversion of propylene was 84.1% and the yield of acrylonitrile, based on the propylene converted was 77.7%. This gives an efficiency of 65.5% for acrylonitrile.

Examples II–III

In these examples a non-homogeneous bismuth phosphomolybdate–$TeO_2$–$HReO_4$ catalyst prepared by procedure 1, with a molar ratio of 100; 30 and 1, respectively, and 250 mols silica was used. The amount of catalyst was sufficient to fill 6 inches of the reactor. The data below show the reaction conditions and results obtained.

|  | II | III |
|---|---|---|
| $O_2$/propylene | 2 | 2 |
| $H_2O$/propylene | 2.4 | 4.8 |
| $NH_3$/propylene | 1 | 2 |
| Contact time (sec.) | 20 | 20 |
| Temp. ° C | 450 | 450 |
| Propylene conversion | 74 | 65 |
| Yield of acrylonitrile | 81.6 | 83.2 |
| Efficiency | 60.5 | 54.1 |
| Acetonitrile | 9.1 | 9.2 |
| HCN | Trace | 0.4 |

Examples IV–V

In these examples a "homogeneous" unsupported bismuth phosphomolybdate, $TeO_2$, $HReO_4$ in molar ratio of 100:30:1, was used. Procedure 3 above was employed except that the silica was omitted. The table below shows the reaction conditions and results obtained.

|  | IV | V |
|---|---|---|
| $O_2$/propylene | 2 | 2.5 |
| $H_2O$/propylene | 4.8 | 2.2 |
| $NH_3$/propylene | 2 | 1 |
| Contact time (sec.) | 20 | 20 |
| Temp. ° C | 450 | 450 |
| Propylene conversion | 62.2 | 83.1 |
| Acrylonitrile yield | 87.0 | 64.5 |
| Efficiency | 54.2 | 53.5 |
| $CH_3CN$ | 0 | 0 |
| HCN | 0 | 0 |

In each of the above examples small amounts of acrolein were formed. This could be recovered easily and recycled with the propylene feed for producing acrylonitrile.

*Example VI*

A "homogeneous" catalyst made by procedure 2, but using twice the amount of $HReO_4$ was employed. This represents a "homogeneous" catalyst on a silica support. The feed stock based on propylene as unity was in a ratio of 2½ parts of oxygen, 2 parts ammonia, and 2.2 parts of water. Contact time was 20 seconds and the reaction temperature was 420° C. The conversion of propylene was 67.2% with an acrylonitrile yield of 81.2% to give an efficiency of 54.6. Only about 0.6% $CH_3CN$ was formed in this reaction.

*Examples VII–XI*

In this set of runs a homogeneous catalyst prepared in accordance with procedure 2 was used. The reaction data are given below:

|  | VII | VIII | IX | X | XI |
|---|---|---|---|---|---|
| $O_2$/propylene | 2 | 2.5 | 2.5 | 2.5 | 2.5 |
| $H_2O$/propylene | 2.2 | 3.6 | 3.6 | 3.6 | 2.2 |
| $NH_3$/propylene | 1.5 | 1.5 | 1.5 | 2 | 1 |
| Contact time (sec.) | 20 | 18 | 18 | 20 | 20 |
| Temp. ° C | 400–425 | 430 | 440 | 440 | 445 |
| Propylene conversion | 62.9 | 74.4 | 73.5 | 71.5 | 67.3 |
| Acrylonitrile yield | 86.6 | 73.2 | 77.1 | 83.6 | 80.6 |
| Efficiency | 54.4 | 54.4 | 56.6 | 59.8 | 54.2 |
| $CH_3CN$ | 0 | 0 | 0 | 0.8 | 0 |
| HCN | 0 | 0 | 0 | 0 | 0 |

*Examples XII—XVIII*

In these runs the same catalyst as that described in the immediately preceding examples was used. The catalyst was not removed from the reactor over a period of 25 hours of actual use to show that catalyst life is maintained over a long period of time.

|  | XII | XIII | XIV | XV | XVI | XVII | XVIII |
|---|---|---|---|---|---|---|---|
| $O_2$/propylene | 2 | 2.5 | 2.5 | 3 | 3 | 3 | 3 |
| $H_2O$/propylene | 3.6 | 3.6 | 3.6 | 4.8 | 4.8 | 5.0 | 5.0 |
| $NH_3$/propylene | 1.5 | 1.5 | 1.5 | 2.0 | 2 | 2 | 2 |
| Contact time (sec.) | 31 | 27 | 27 | 22 | 22 | 29 | 29 |
| Temp. ° C | 400 | 430 | 450 | 450 | 445 | 450 | 450 |
| Propylene conversion | 60.8 | 76.9 | 88.3 | 95.4 | 89.6 | 94.8 | 90.6 |
| Acrylonitrile yield | 83.9 | 84 | 76.2 | 52.8 | 70.4 | 80.0 | 79.8 |
| Efficiency | 51 | 64.6 | 67.3 | 50.3 | 63.0 | 75.8 | 72.3 |
| $CH_3CN$ |  |  |  |  |  | 0.8 | 0.4 |
| HCN |  |  |  |  |  | 0 | 0 |

*Example XIX*

A "homogeneous" catalyst made by the process of procedure 2 was used. The feed into the reactor consisted of a mixture of 75% propylene and 25% propane by volume. The ratio of oxygen and ammonia to propylene were 2.5 to 1 and 1 to 1, respectively. The water vapor ratio was 4 based on propylene. This reaction was run at 440° C. with a contact time of 20 seconds. Analysis showed a propylene conversion of 59.8%, a yield of acrylonitrile of 87.5% and an efficiency of 52.3%. From these data it is apparent that saturated gaseous hydrocarbons do not interfere with the catalytic conversion of propylene to acrylonitrile.

*Example XX*

For purposes of comparison a catalyst of bismuth phosphomolybdate (100) $TeO_2$ (30) $HReO_4$ (1) silica (250) molar ratio was used to prepare acrylonitrile from a mixture containing 2 mols $O_2$, 1 mol propylene, 1½ mols ammonia and 4 mols water. The reaction was run at 370–400° C. with a contact time of 20 seconds. End product analysis showed a propylene conversion of 49.5%, a yield of acrylonitrile of 89.8% and an efficiency of 44.5%. When a catalyst containing no rhenium was substituted, and the above mixture was reacted at 410° C. the propylene conversion dropped to 39.4% with an acrylonitrile yield of 93.2% for an efficiency of 36.7%.

*Example XXI*

A homogeneous catalyst was prepared by procedure 2 using the following molar ratios of ingredients: $MoO_3$ (75), Sn (25), Te (25), $P_2O_7$ (3), Re (1), and Si (250). The tin salt employed was $SnCl_4 \cdot 5H_2O$. The catalyst was tin phosphomolybdate containing tellurium and rhenium as oxides. A mixture containing 2.5 mols oxygen, 4.1 mols water vapor, 1.05 mols ammonia and 1 mol of propylene was passed through a 6 inch layer of catalyst at a temperature of 420° C. with a contact time of 18 seconds. Analysis of end products showed that the propylene conversion was 90.1% with an acrylonitrile yield of 84.0%, for an efficiency of 75.8%.

*Example XXII*

A tin molybdate catalyst, having a molar ratio of 75 $MoO_3$, 50 Sn, 15 Te and 0.2 Re on 125 mols of colloidal silica, was used in this example. The $NH_3/C_3H_6$ ratio was 1, and the $O_2/C_3H_6$ ratio was 2.5. The cold contact time was 18 seconds and temperature varied between 410° and 420° C. The reaction conditions were otherwise the same as those of Example XXI, in a fixed bed system. The propylene converted was 98.9% with an 82.1% yield of acrylonitrile for an efficiency of 81.2%.

Other catalysts, using molar ratios of $TeO_2$ of 10 to 50 and $HReO_4$ of 1 to 10 per 100 mols of bismuth, antimony or tin phosphomolybdate, can also be used to convert propylenes to acrylonitrile but there is no significant change in results in using the higher ratios of tellurium or rhenium. However, it is essential that both tellurium and rhenium be present, because the lack of one of these two ingredients results in considerable lower activity for the catalyst.

We claim:

1. A composition consisting essentially of a molar ratio (1) 100 mols of a member selected from the class consisting of (A) bismuth, antimony and tin phosphomolybdates and (B) tin molybdate (2) from about 10 to about 50 mols of $TeO_2$ and (3) from about 1 to about 10 mols of $HReO_4$.

2. A composition consisting essentially of (1) 100 mols bismuth phosphomolybdate, (2) about 30 mols $TeO_2$ and (3) from about 1 to 2 mols $HReO_4$.

3. The composition of claim 2 on a silicic support.

4. The composition of claim 1 on a silicic support.

(References on following page)

References Cited

UNITED STATES PATENTS

| | | | |
|---|---|---|---|
| 2,941,007 | 6/1960 | Callaham et al. | 260—604 |
| 3,126,407 | 3/1964 | Cottle et al. | 260—465.3 |
| 3,135,807 | 6/1964 | Grasselli et al. | 260—680 |
| 3,152,170 | 10/1964 | Barclay et al. | 260—465.3 |
| 3,200,141 | 10/1965 | Milberger | 260—465.3 |
| 3,228,890 | 1/1966 | Eden | 252—437 |

OSCAR R. VERTIZ, *Primary Examiner.*

A. GREIF, *Assistant Examiner.*